(12) United States Patent
Anderson et al.

(10) Patent No.: US 12,717,578 B2
(45) **Date of Patent: *Aug. 25, 2026**

(54) PREDICATION METHODS FOR VECTOR PROCESSORS

(71) Applicant: TEXAS INSTRUMENTS INCORPORATED, Dallas, TX (US)

(72) Inventors: Timothy Anderson, University Park, TX (US); Duc Quang Bui, Grand Prairie, TX (US); Joseph Zbiciak, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 506 days.

This patent is subject to a terminal disclaimer.

(21) Appl. No.: 17/738,993

(22) Filed: May 6, 2022

(65) Prior Publication Data

US 2022/0261245 A1 Aug. 18, 2022

Related U.S. Application Data

(63) Continuation of application No. 16/361,449, filed on Mar. 22, 2019, now Pat. No. 11,334,354, which is a continuation of application No. 14/327,038, filed on Jul. 9, 2014, now Pat. No. 10,318,293.

(60) Provisional application No. 61/844,106, filed on Jul. 9, 2013.

(51) Int. Cl.
*G06F 9/30* (2018.01)
*G06F 9/38* (2018.01)

(52) U.S. Cl.
CPC ...... *G06F 9/30036* (2013.01); *G06F 9/30038* (2023.08); *G06F 9/30072* (2013.01); *G06F 9/30101* (2013.01); *G06F 9/30145* (2013.01); *G06F 9/30185* (2013.01); *G06F 9/3853* (2013.01); *G06F 9/3867* (2013.01); *G06F 9/3885* (2013.01)

(58) Field of Classification Search
None
See application file for complete search history.

(56) References Cited

U.S. PATENT DOCUMENTS

| | | | |
|---|---|---|---|
| 5,659,722 | A | 8/1997 | Blaner et al. |
| 5,815,695 | A | 9/1998 | James et al. |
| 6,041,399 | A | 3/2000 | Terada et al. |
| 2003/0005365 | A1 | 1/2003 | Wilson |
| 2003/0037221 | A1 | 2/2003 | Gschwind et al. |
| 2003/0074544 | A1 | 4/2003 | Wilson |

(Continued)

OTHER PUBLICATIONS

Kathail et al., "HPL-PD Architecture Specification: Version 1.1," 2000.

*Primary Examiner* — John M Lindlof
(74) *Attorney, Agent, or Firm* — Carl G. Peterson; Frank D. Cimino

(57) ABSTRACT

A technique for method for executing instructions in a processor includes receiving a first instruction, receiving a second instruction, identifying a functional unit specified by an opcode contained in an opcode field of the first instruction, selecting a field of the second instruction that contains predicate information based on the identified functional unit, and executing the first instruction in a conditional manner using the identified functional unit and the predicate information contained in the selected field of the second instruction.

20 Claims, 8 Drawing Sheets

31 29 28 12 1 0

| creg | z | dst | src2 | scr1/cst | opcode | p |
|---|---|---|---|---|---|---|

(56) References Cited

U.S. PATENT DOCUMENTS

| | | | | |
|---|---|---|---|---|
| 2005/0203928 | A1* | 9/2005 | Sankaran | G06F 9/30032 |
| 2005/0278514 | A1* | 12/2005 | Wilson | G06F 9/30094 712/234 |
| 2008/0016320 | A1* | 1/2008 | Menon | G06F 9/30036 712/E9.001 |
| 2008/0184211 | A1 | 7/2008 | Nickolls | |
| 2009/0235051 | A1 | 9/2009 | Codrescu et al. | |
| 2012/0017067 | A1* | 1/2012 | Sankaran | G06F 9/3822 712/205 |
| 2012/0084539 | A1 | 4/2012 | Nyland | |
| 2013/0159675 | A1 | 6/2013 | Muff et al. | |

* cited by examiner

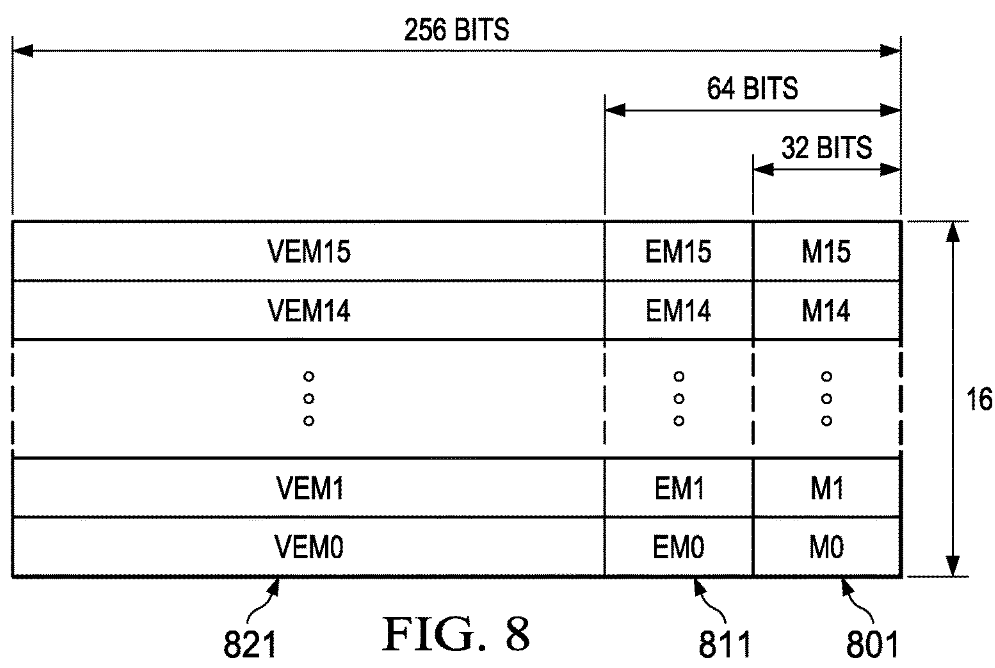
FIG. 8
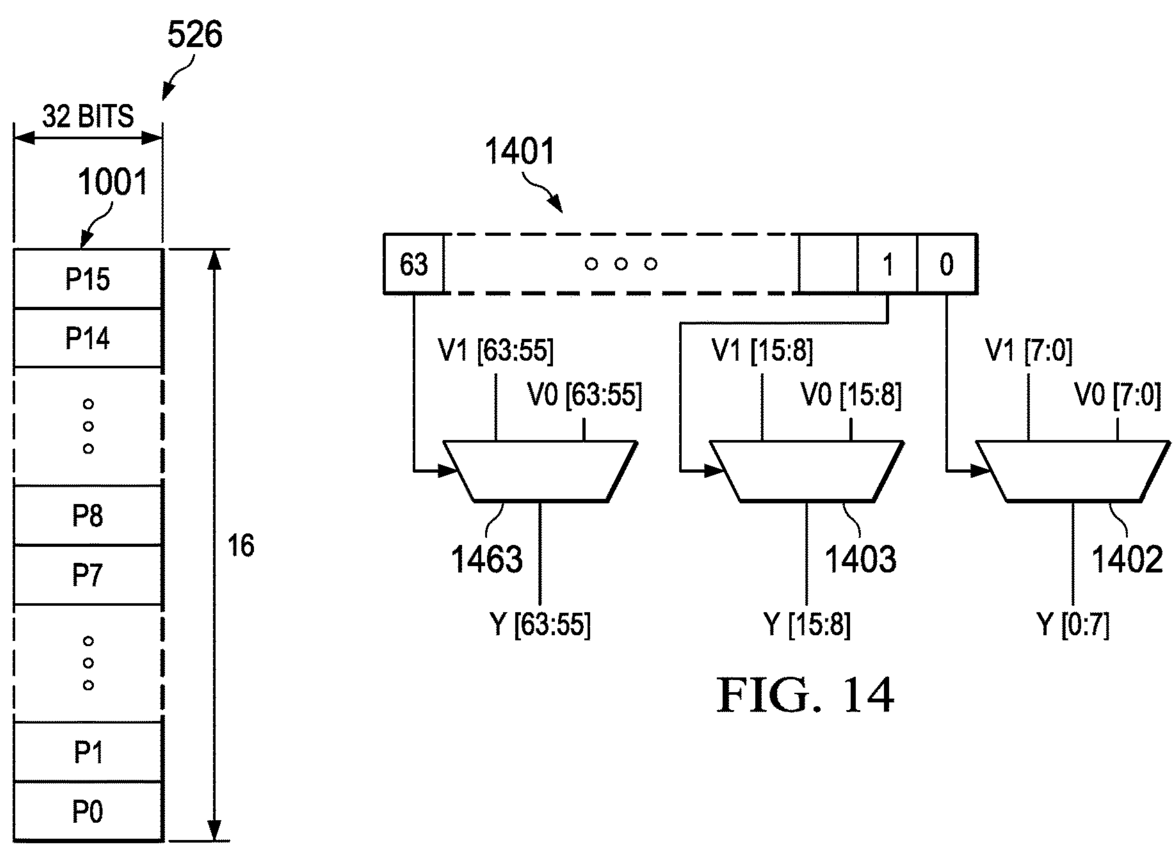
FIG. 10
FIG. 14

PREDICATION METHODS FOR VECTOR PROCESSORS

CROSS-REFERENCE TO RELATED APPLICATIONS

This application is a continuation of U.S. patent application Ser. No. 16/361,449 filed Mar. 22, 2019, which is a continuation of U.S. patent application Ser. No. 14/327,038 filed on Jul. 9, 2014 (now U.S. Pat. No. 10,318,293 issued Jun. 11, 2019), which claims priority to U.S. Provisional Patent Application No. 61/844,106, filed on Jul. 9, 2013, all of which are incorporated herein by reference.

TECHNICAL FIELD

The technical field of this invention is digital data processing.

BACKGROUND

Most computer programs contain code which will be executed only under specific conditions depending on factors which cannot be determined before-hand, for example user input. As the majority of processors simply execute the next instruction in a sequence, the traditional solution is to insert branch instructions that allow a program to conditionally branch to a different section of code, thus changing the next step in the sequence. This was sufficient until designers began improving performance by implementing instruction pipelining, a method which is slowed down by branches. With branch predication, all possible branch paths are coded inline, but some instructions execute while others do not. The basic idea is that each instruction is associated with a predicate (the word here used similarly to its usage in predicate logic) and that the instruction will only be executed if the predicate is true.

SUMMARY

A method of branch predication that reduces opcode requirement by eliminating the directly embedded predication field in most instructions, and having dedicated vector predicate registers with a predicate functional unit that allows the easy manipulation of predication bits without adversely utilizing another execution unit.

In accordance with one aspect of the disclosure, a method for executing instructions in a processor includes receiving a first instruction, receiving a second instruction, identifying a functional unit specified by an opcode contained in an opcode field of the first instruction, selecting a field of the second instruction that contains predicate information based on the identified functional unit, and executing the first instruction in a conditional manner using the identified functional unit and the predicate information contained in the selected field of the second instruction.

In accordance with a further aspect of the disclosure, a data processing device includes a predicate register file including predicate registers, a memory to store instructions, and a processing pipeline that includes a plurality of functional units. When receiving a packet of instructions fetched from the memory that includes a predicated instruction and a condition code extension instruction containing a plurality of predicate fields each corresponding to a respective one of the functional units, the processing pipeline is configured to determine a target functional unit according to an opcode contained in an opcode field of the predicated instruction, identify predicate information contained in the predicate field of the condition code extension instruction that corresponds to the target functional unit, and cause the predicated instruction to be executed in a predicated manner using the using the target functional unit and the identified predicate information.

In accordance with yet a further aspect of the disclosure, a method for executing a predicated instruction in a processor includes receiving an fetch packet of instructions that includes the predicated instruction and a condition code extension instruction, wherein the condition code extension instruction includes a plurality of predication fields each corresponding to a respective functional unit of the processor, determining a target functional unit based on an opcode field of the predicated instruction, executing the predicated instruction in a predicated manner using the target functional unit and predicate information contained in a predicate field of the condition code extension instruction that corresponds to the target functional unit, wherein the predicate information indicates a condition and identifies a predicate register in a predicate register file of the processor.

BRIEF DESCRIPTION OF THE DRAWINGS

These and other aspects of this invention are illustrated in the drawings, in which:

FIG. 8 illustrates a local vector register file shared by multiply and correlation functional units;

FIG. 10 illustrates a predicate register file;

FIG. 14 illustrates an implementation of the VSEL instruction.

DETAILED DESCRIPTION

Figures 1, 2:
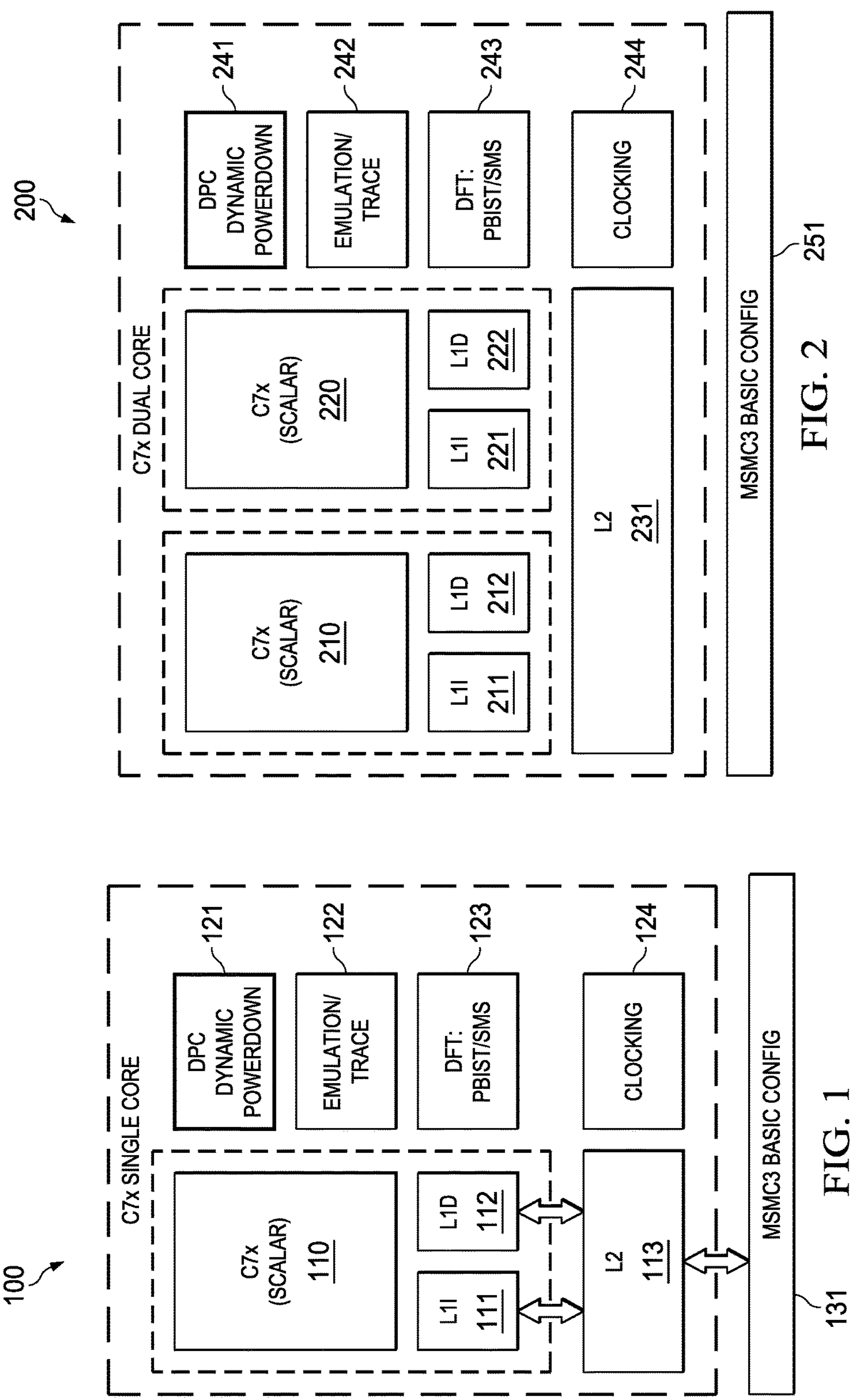
FIG. 1 illustrates a single core scalar processor according to one embodiment of this invention.
FIG. 2 illustrates a dual core scalar processor according to another embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I)

111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 245, emulation/trace circuits 116, design for test (DST) programmable built-in self test (PBIST) circuit 117 and clocking circuit 118. This single integrated circuit may also include memory controller 251.

Figure 3:
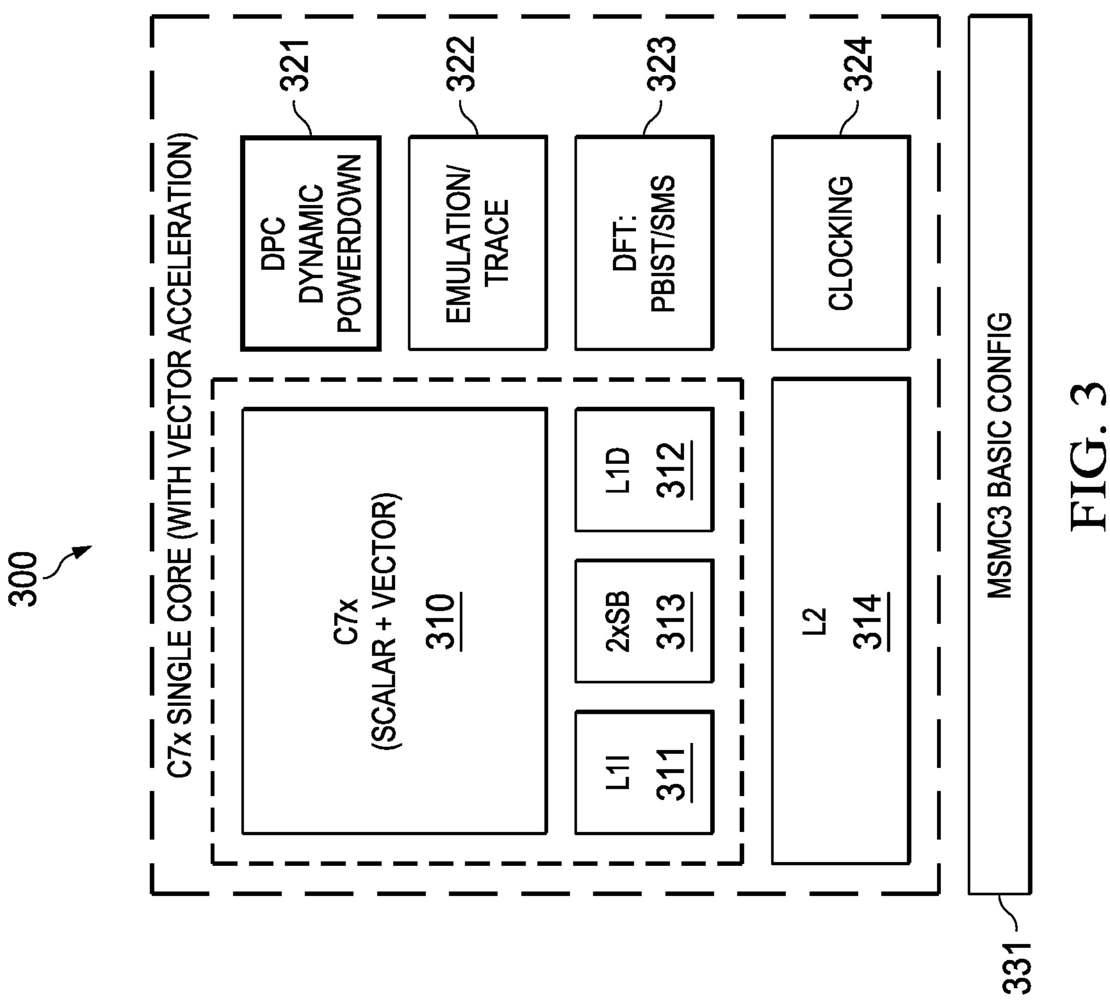
FIG. 3 illustrates a single core vector processor according to a further embodiment of this invention.
Figure 4:
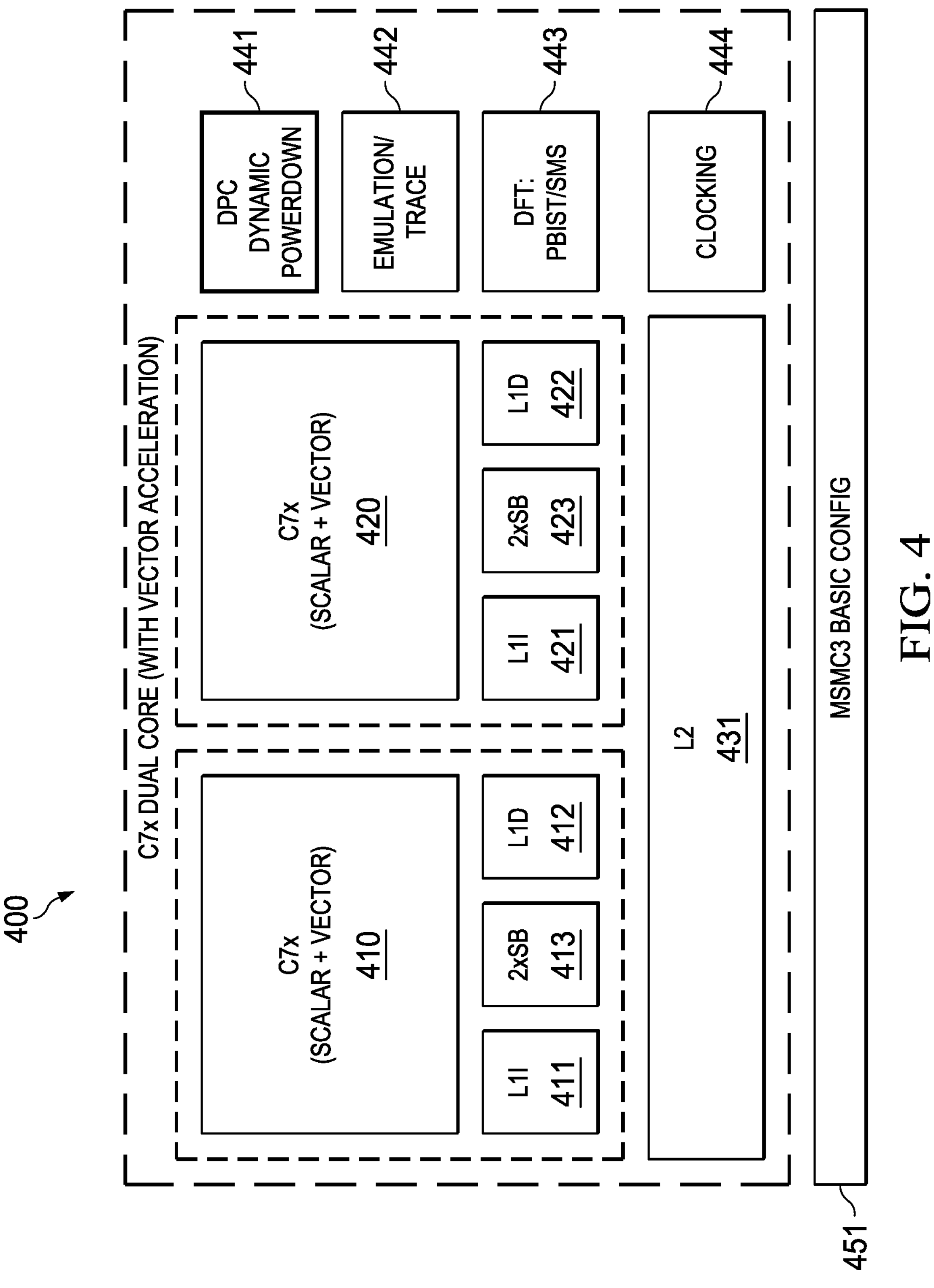
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units, as further described below. Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
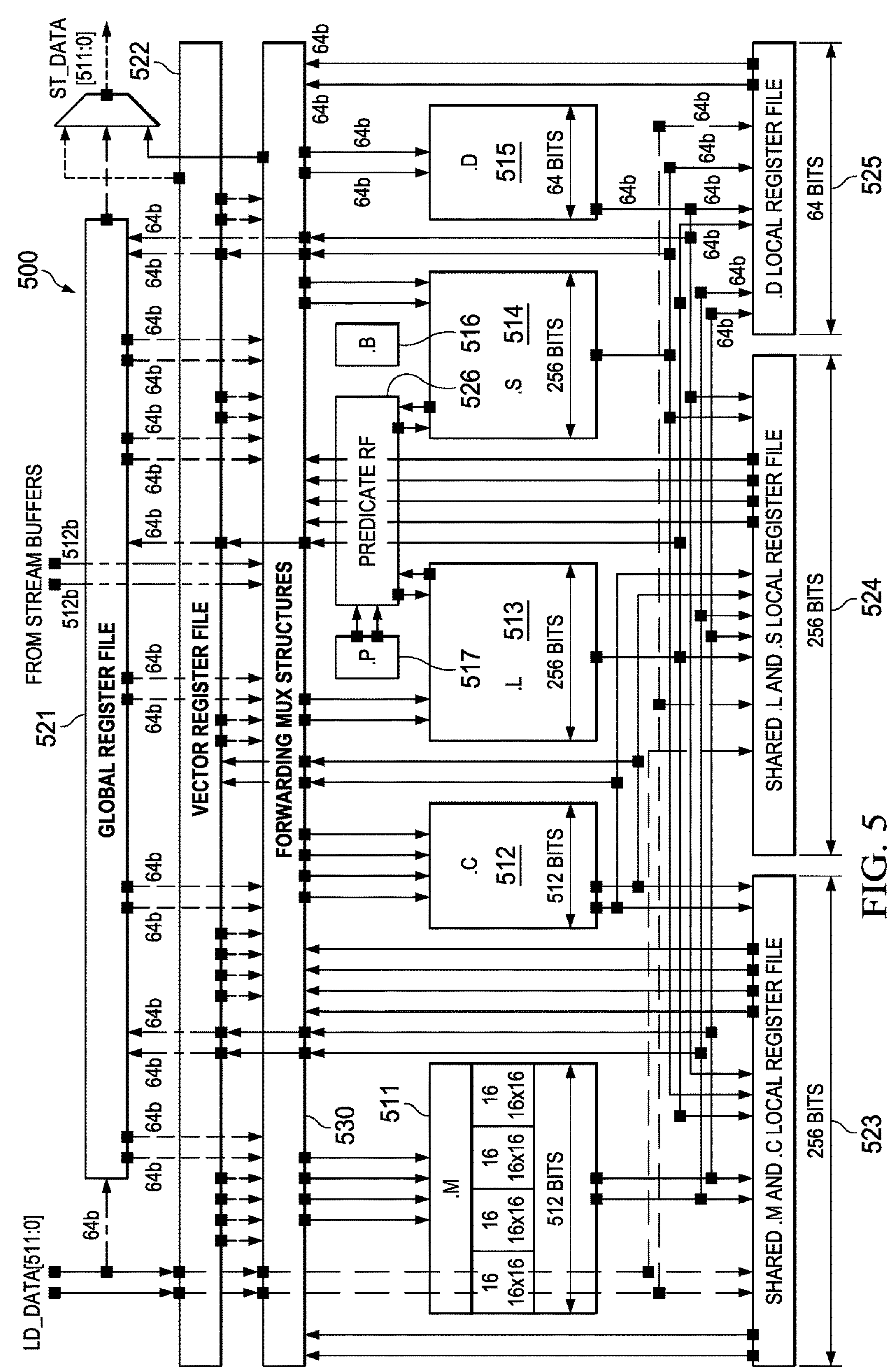
FIG. 5 illustrates the construction of one embodiment of a central processing unit.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413, and 423 transfers data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened, the streaming engine calculates the address, fetches the defined data type from level two unified cache, performs data type manipulation such as zero extension, sign extension, data element sorting/swapping such as matrix transposition, and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They reduce the number of cache miss stalls since the stream buffer can bypass L1D cache and L2 cache. They reduce the number of scalar operations required in the loop to maintain. They manage the address pointers. They handle address generation automatically freeing up the address generation instruction slots and the .D unit for other computations.

FIG. 5 illustrates construction of one embodiment of a CPU of this invention. Except where noted this description covers both scalar CPUs and vector CPUs. The CPU embodiment depicted in FIG. 5 includes the following execution units: multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations, moves, as well as adds and subtracts. As illustrated in FIG. 5, multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine, and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various compare and minimum/maximum instructions which write results directly to predicate register file 526 (further described below). Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and S. local register file 524, and predicate register file 526 in a manner described below. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT, RMBD, BIT Decimate and Expand, etc.

Figures 6, 7, 9:
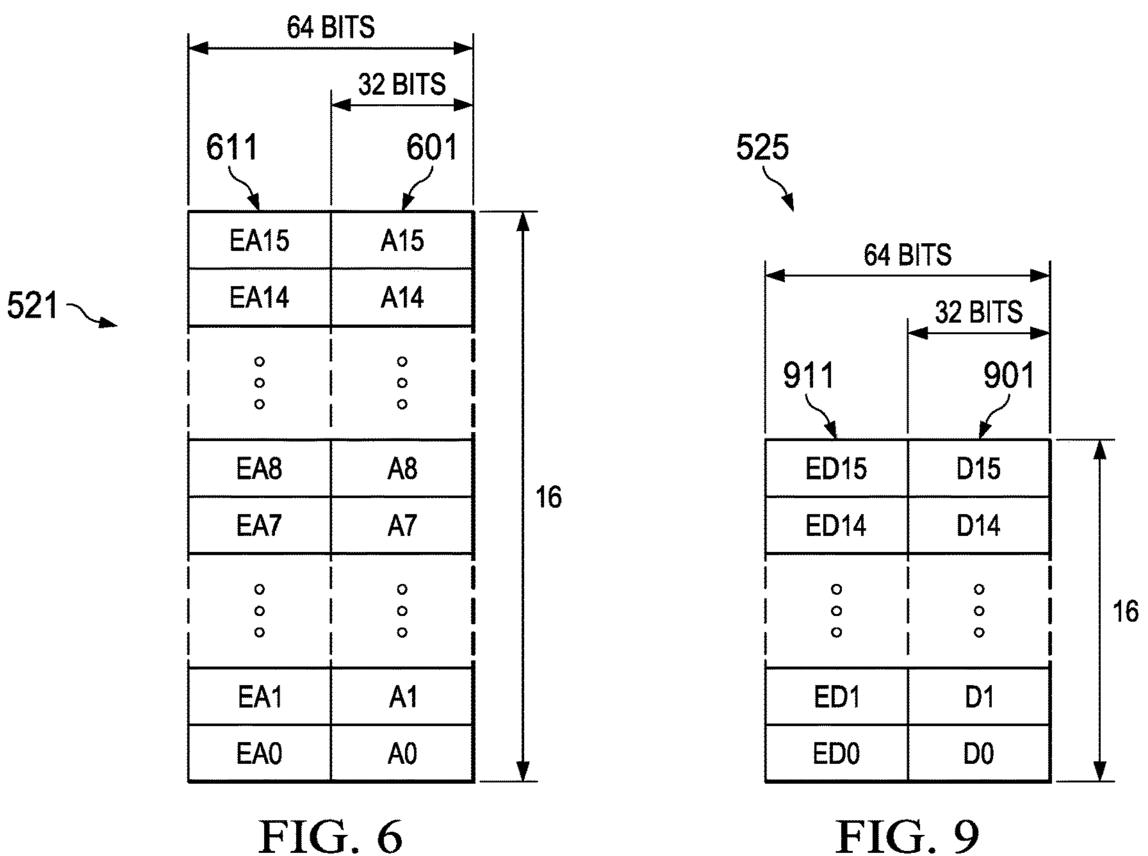
FIG. 6 illustrates a global scalar register file.
FIG. 7 illustrates a global vector register file.
FIG. 9 illustrates a local register file of a load/store unit.

FIG. 6 illustrates global scalar register file 521. There are 16 independent 64-bit wide scalar registers. Each register of global scalar register file 521 can be read as 32-bits of scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read from or write to global scalar register file 521. The instruction type determines the data size. Global scalar register file 521 supports data types ranging in size from 8-bits through 64-bits. A vector instruction can also write to the 64-bit global scalar registers 521 with the upper 192-bit of the vector being discarded. A vector instruction can also read 64-bit data from the global scalar register file 511. In this case the operand is zero-extended in the upper 192-bits to form an input vector.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VM0 to VM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192-bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not to store data or as sources for 64-bit arithmetic and logical instructions of load/store unit 515.

FIG. 10 illustrates the predicate register file 526. There are sixteen registers 32-bit registers in predicate register file 526 of this embodiment. Predicate register file 526 contains the results from vector comparison operations and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predicate register (designated P0 to P15) controls a byte of a vector data. Since a vector is 256-bits in this example, the width of a predicate register equals 256/8=32 bits. The predicate register file 526 can be written to by vector comparison operations to store the results of the vector compares. In an embodiment where a vector is 512-bits, such as described below in FIG. 15, the width of a predicate register equals 512/8=64 bits.

A CPU, such as CPU 110, 210, 220, 310, 410, or 420, operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched in instruction packets of fixed length further described below. All instructions require the same number of pipeline phases for fetch and decode, but require a varying number of execute phases.

Figure 11:
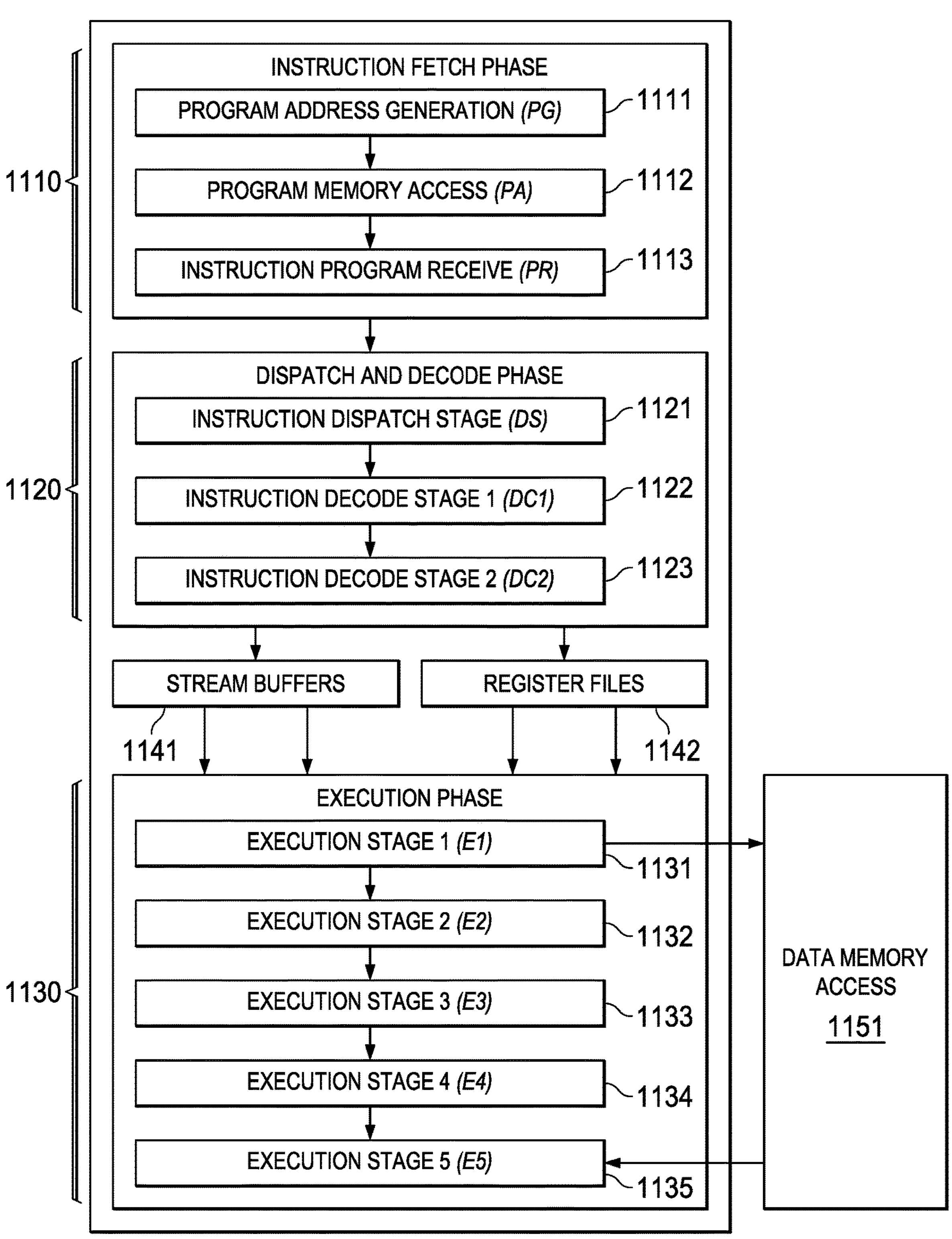
FIG. 11 illustrates pipeline phases of a central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figures 12, 13:
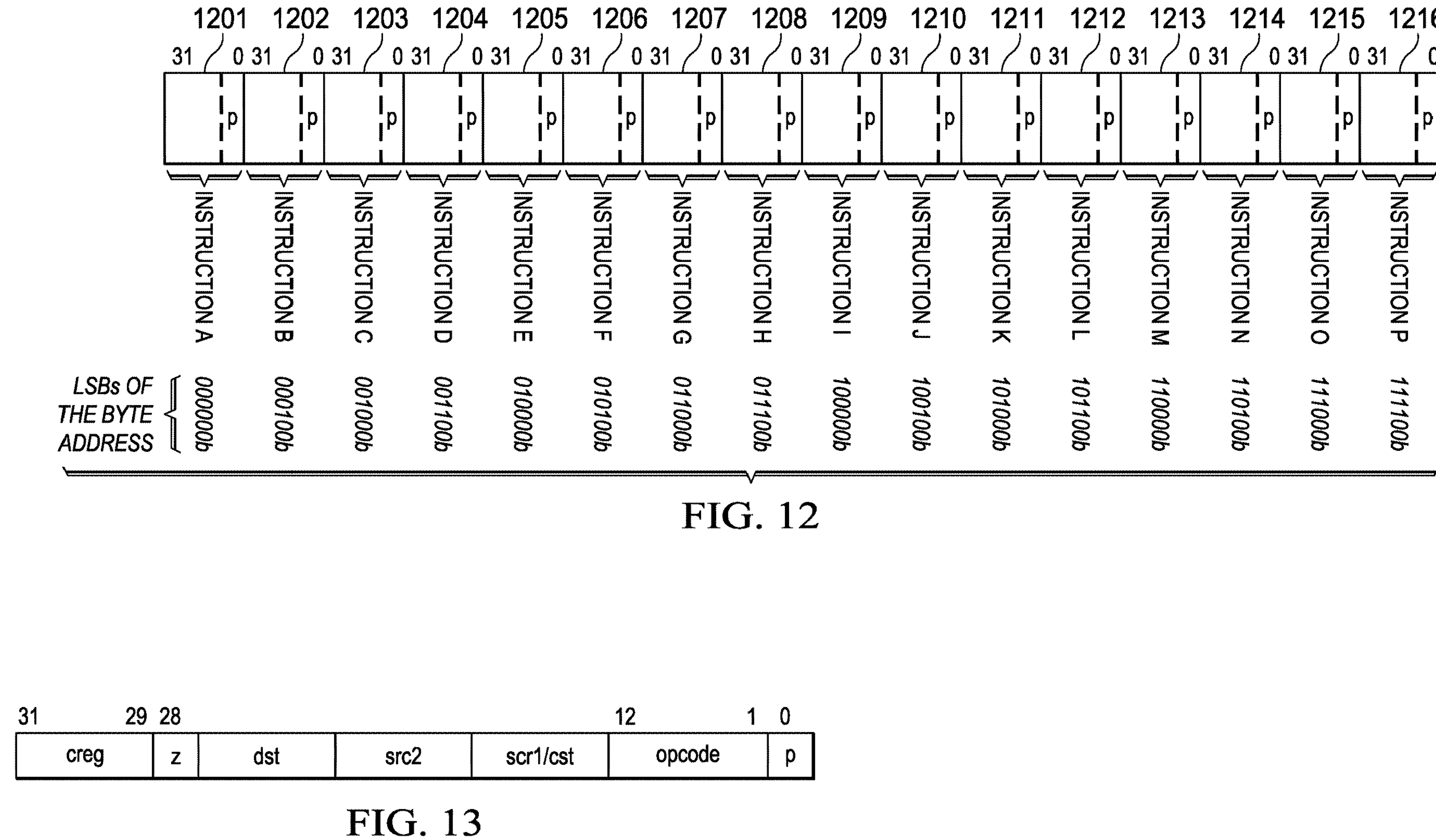
FIG. 12 illustrates sixteen instructions of a single fetch packet.
FIG. 13 illustrates an example of the instruction coding of instructions used by this invention.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots in this embodiment. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit-less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1110 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as the reading of operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.1

During execute 5 stage 1135 (E5) load instructions write data into a register. This is illustrated schematically in FIG. 11 with input from memory 1151 to execute 5 stage 1135.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a "do not care" state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | •L |
| 7:4 | •S |
| 11:5 | •D |
| 15:12 | •M |
| 19:16 | •C |
| 23:20 | •B |
| 28:24 | Reserved |
| 31:29 | Reserved |

Thus the condition code extension slot specifies bits decoded in the same way the creg/z bits assigned to a particular functional unit in the same execute packet.

The dst field specifies a register in a corresponding register file as the destination of the instruction results.

The scr2 field specifies a register in a corresponding register file as the second source operand.

The scr1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Efficient and flexible fine grain predications for wide SIMD vector data while maintaining fast scalar predication for both vector and scalar data is implemented by:

(1) Common scalar predicate registers for both scalar and vector instructions, using a set of general purpose registers for both scalar and vector instructions.

(2) Dedicated vector predicate registers for fine-grain predication of vector instructions where each bit of a predicate register controls 8 bits of vector data.

(3) A dedicated predication unit which can perform various predicate bit manipulation operations.

Only a few selected instructions have a scalar predicate field embedded directly in the opcode while majority of instructions are unconditional. All unconditional instructions in turn can be made predicated by utilizing an extension header. Specifically, to reduce opcode space, only a number of selected instructions contain the CREGZ field directly in the encoding. These are the instructions which get used the most to alter program control flows such as branches and move instructions. The rest of the instructions do not have the CREGZ field encoded directly within, and are normally treated as non-conditional instructions. However, if needed, an execute packet can contain a unique 32-bit Condition Code Extension slot which contains the 4-bit CREGZ fields for the instructions which are in the same execute packet.

Only a few selected instructions (i.e. predicated stores) have a vector predicate field embedded directly in the opcode. A special vector instruction is provided (i.e. VSEL) which can be used in conjunction to emulate vector predication.

The VSEL instruction is used to emulate vector predication. The compiler provides a vector predicate intrinsic _VPRED( ) to allow predication for all vector instructions. The intrinsic utilizes the VSEL instruction to emulate predicated vector instructions. The following assembly code emulates a predicated vector add operation, where P0 is the predicate register controlling whether the result of the VADD instruction gets written into the vector register VX3 or not:

```
VCMPEQ VX1, VX2, P0
VADD VX1, VX2, VX4
VSEL P0, VX4, VX3
```

FIG. 14 illustrates the operation of the VSEL instruction in an embodiment where a vector is 512 bits and each predicate register is 64 bits wide. The arguments of VSEL are the selected Predicate Register 1401, and two 512-bit vectors V0 and V1. Each bit in the 64-bit wide Predicate Register 1401 selects a respective 8 bits of vector data from vector V0 or V1 depending on the value of the bit, as shown using multiplexers 1402 through 1465.

Results of vector compare and vector min/max instructions can be written directly to the vector predicate register file to be used as predications for following instructions.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method comprising:

receiving, by a processor, a predicated instruction including a first field, a second field, and a third field, wherein the first field identifies a predicate register, the second field identifies a condition, and the third field identifies a predication unit for the predicated instruction, and wherein the predication unit is a dedicated predication unit for writing to the predicate register;

executing, by the processor, the predicated instruction using the predication unit to generate a result; and storing the result in the predicate register.

2. The method of claim 1, wherein:

the second field indicates whether predication is based upon zero or not zero in the predicate register.

3. The method of claim 1, wherein:

in response to the first field and the second field indicating zero, the predicated instruction is processed by the processor unconditionally.

4. The method of claim 1, wherein:

the predicated instruction is one of multiple instructions in an execute packet; and the multiple instructions are executed, by the processor, in parallel within a same execution cycle.

5. The method of claim 4, wherein:

each of the multiple instructions is associated with a different functional unit; and the predication unit is the only functional unit that can write to the predicate register.

6. The method of claim 1, wherein:

the first field is a creg field; and the second field is a z field.

7. The method of claim 1, wherein:

the predicated instruction is 32 bits;

the second field is bit 28; and the first field is bits 29-31.

8. A method comprising:

receiving, by a processor, an execute packet of instructions including:

a plurality of instructions;

a first instruction of the plurality of the instructions includes a first field identifying a predication unit for the first instruction;

a subset of the plurality of instructions, wherein each instruction in the subset of the plurality of instructions includes a second field identifying a functional unit for the instruction; and a condition code extension instruction including predicate information for the functional units, wherein the predication unit is a dedicated predication unit for updating the predicate information;

determining, by the processor, the respective functional unit for each instruction of the subset of the plurality of instructions based on the first field;

executing, by the processor, the first instruction using the predication unit to update the predicate information; and executing, by the processor, the plurality of instructions using the functional units and using the updated predicate information.

9. The method of claim 8, wherein:

the condition code extension instruction is a 32-bit code.

10. The method of claim 9, wherein:

the predicate information is the 32-bit code;

the predication unit is the only functional unit that can update the predicate information; and the 32-bit code identifies predicate registers for respective functional units.

11. The method of claim 8, wherein:

each of the subset of the plurality of instructions is executed in parallel.

12. The method of claim 11, wherein:

a bit in each of the subset of the plurality of instructions is set to indicate parallel execution.

13. The method of claim 8, wherein:

the plurality of instructions includes eight or fewer instructions.

14. The method of claim 8, wherein:

the plurality of instructions is a plurality of vector instructions.

15. A data processing device comprising:

a predicate register file;

a plurality of functional units including a predication unit;

a memory to store instructions; and a processing pipeline configurable to execute a packet of instructions fetched from the memory, wherein the packet of instructions includes:

a first instruction;

a predicated instruction; and a condition code extension instruction;

wherein the first instruction includes a first field identifying the predication unit and a second field identifying a predicate register of the predicate register file;

wherein the predicated instruction includes a field identifying a first functional unit of the plurality of functional units;

wherein the condition code extension instruction includes a predicate field identifying the predicate register;

wherein the predication unit is configured to execute the first instruction to update the predicate register;

wherein the predication unit is a dedicated predication unit for writing to the predicate register;

wherein each bit in the updated predicate register selects a portion of a first vector or a portion of a second vector; and wherein the predicate register is associated with the first functional unit of the plurality of functional units.

16. The data processing device of claim 15, wherein:

the predicated instruction is executed in a predicated manner using the first functional unit of the plurality of the functional units.

17. The data processing device of claim 15, wherein:

the predicate field is a three bit code.

18. The data processing device of claim 15, wherein:

the plurality of functional units include a multiply unit, an arithmetic unit, a load/store unit, a branch unit, the predication unit, and a correlation unit.

19. The data processing device of claim 15, wherein:

the predicate field includes a z field and a creg field.

20. The data processing device of claim 15, wherein the predicated instruction identifies the first vector and the second vector.

* * * * *